(12) United States Patent
Li et al.

(10) Patent No.: US 11,709,503 B2
(45) Date of Patent: Jul. 25, 2023

(54) EXCEPTION HANDLING FOR AUTONOMOUS VEHICLES

(71) Applicant: Waymo LLC, Mountain View, CA (US)

(72) Inventors: Dong Li, Los Gatos, CA (US); Matthew McNaughton, Mountain View, CA (US); Shir Yehoshua, San Francisco, CA (US); Aida Khosroshahi, San Jose, CA (US); Ioan-Alexandru Sucan, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/712,760

(22) Filed: Apr. 4, 2022

(65) Prior Publication Data

US 2022/0229445 A1    Jul. 21, 2022

Related U.S. Application Data

(63) Continuation of application No. 16/383,096, filed on Apr. 12, 2019, now Pat. No. 11,327,507.

(51) Int. Cl.
*B60W 60/00* (2020.01)
*G05D 1/02* (2020.01)
*G05D 1/00* (2006.01)

(52) U.S. Cl.
CPC ......... *G05D 1/0289* (2013.01); *G05D 1/0088* (2013.01); *G05D 1/0223* (2013.01)

(58) Field of Classification Search
CPC .. G05D 1/0289; G05D 1/0223; G05D 1/0088; B60W 60/001; B60W 30/0956;
(Continued)

(56) References Cited

U.S. PATENT DOCUMENTS 7,631,552 B2 * 12/2009 Keski-Hynnila ..... G01M 15/05
73/114.74
7,797,107 B2    9/2010 Shiller
(Continued)

FOREIGN PATENT DOCUMENTS

CN    101859494 A    10/2010
CN    108597251 A    9/2018
(Continued)

OTHER PUBLICATIONS

International Search Report and Written Opinion for Application No. PCT/US2020/027662 dated Jul. 21, 2020.
(Continued)

*Primary Examiner* — Donald J Wallace
*Assistant Examiner* — Daniel M. Robert
(74) *Attorney, Agent, or Firm* — Botos Churchill IP Law

(57) ABSTRACT

Aspects of the technology relate to exception handling for a vehicle. For instance, a current trajectory for the vehicle and sensor data corresponding to one or more objects may be received. Based on the received sensor data, projected trajectories of the one or more objects may be determined. Potential collisions with the one or more objects may be determined based on the projected trajectories and the current trajectory. One of the potential collisions that is earliest in time may be identified. Based on the one of the potential collisions, a safety-time-horizon (STH) may be identified. When a runtime exception occurs, before performing a precautionary maneuver to avoid a collision, waiting no longer than the STH for the runtime exception to resolve.

19 Claims, 9 Drawing Sheets

(58) Field of Classification Search
CPC ............. B60W 2420/52; B60W 30/09; B60W 30/0953; B60W 50/035; G08G 1/166; G08G 1/163

See application file for complete search history.

(56) References Cited

U.S. PATENT DOCUMENTS

| | | | |
|---|---|---|---|
| 8,260,538 B2* | 9/2012 | Noda | B60T 7/22 342/107 |
| 9,216,745 B2 | 12/2015 | Beardsley et al. | |
| 9,221,396 B1 | 12/2015 | Zhu et al. | |
| 9,873,427 B2 | 1/2018 | Danzl et al. | |
| 10,042,363 B1 | 8/2018 | Hayward | |
| 10,061,313 B2* | 8/2018 | Letwin | B60T 8/17557 |
| 10,139,828 B2* | 11/2018 | Ho | B60W 30/00 |
| 10,331,127 B2* | 6/2019 | Oba | B60W 50/082 |
| 10,611,371 B2* | 4/2020 | Kusano | G06V 10/82 |
| 10,829,128 B2* | 11/2020 | Hoshikawa | B60W 50/0097 |
| 11,327,507 B2* | 5/2022 | Li | B60W 60/001 |
| 2009/0088977 A1 | 4/2009 | Yasuhara et al. | |
| 2010/0256852 A1* | 10/2010 | Mudalige | G08G 1/164 701/24 |
| 2012/0203418 A1 | 8/2012 | Braennstroem et al. | |
| 2012/0303216 A1 | 11/2012 | Yoshimura et al. | |
| 2017/0060368 A1 | 3/2017 | Kochura | |
| 2017/0349169 A1* | 12/2017 | Deshpande | B60W 10/18 |
| 2017/0351261 A1 | 12/2017 | Levinson et al. | |
| 2018/0093676 A1 | 4/2018 | Emura et al. | |
| 2018/0286242 A1 | 10/2018 | Talamonti et al. | |
| 2018/0339712 A1 | 11/2018 | Kislovskiy et al. | |
| 2019/0291726 A1 | 9/2019 | Shalev-Shwartz et al. | |
| 2020/0148201 A1* | 5/2020 | King | B60W 30/09 |

FOREIGN PATENT DOCUMENTS

| | | |
|---|---|---|
| CN | 109311474 A | 2/2019 |
| DE | 102004051758 A1 | 4/2006 |
| DE | 102008001301 A1 | 10/2009 |
| JP | 2009085761 A | 4/2009 |
| JP | 2009196464 A | 9/2009 |
| JP | 2012216017 A | 11/2012 |
| JP | 2019527397 A | 9/2019 |

OTHER PUBLICATIONS

""Determining the maximum time horizon for vehicles to safely follow a trajectory"", Magdici et al. (S. Magdici, Z. Ye and M. Althoff, 2017 IEEE 20th International Conference on Intelligent Transportation Systems (ITSC), 2017, pp. 1-7, doi: 10.1109/ITSC.2017.8317696) (Year: 2017).

The Extended European Search Report for European Patent Application No. 20787044.5, dated Nov. 7, 2022, 6 Pages.

Rudametkin, "Robusta: An Approach to Building Dynamic Applications", Software Engineering, 2013, 212 Pages.

Notice of Allowance for Chinese Patent Application No. 202080028282.X, dated Jun. 21, 2022.

"A Framework for Automated Driving System Testable Cases and Scenarios", NHTSA, 2018, 180 pages, downloaded on May 23, 2023 at url: https://www.nhtsa.gov/sites/nhtsa.gov/files/documents/13882-automateddrivingsystems_092618_v1a_tag.pdf.

Xue, et al., "A Fallback Approach for an Automated Vehicle Encountering Sensor Failure in Monitoring Environment", IEEE Intelligent Vehicles Symposium (IV), 2018, pp. 1807-1812.

Decision to Grant a Patent for Japanese Patent Application No. 2021-557966, dated May 24, 2023, 5 Pages.

* cited by examiner

EXCEPTION HANDLING FOR AUTONOMOUS VEHICLES

CROSS REFERENCE TO RELATED APPLICATIONS

The present application is a continuation of U.S. patent application Ser. No. 16/383,096, filed Apr. 12, 2019, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location. Autonomous vehicles may typically rely on software and hardware systems operating in a timely, cohesive manner to successfully and safely maneuver the vehicle from one point to another. In the event a computing device of the vehicle encounters a runtime exception that prevents or otherwise delays the system from operating as expected, the safe operation of the vehicle may be compromised.

BRIEF SUMMARY

One aspect of the disclosure provides a method of exception handling for a vehicle, the method comprising: receiving, by one or more processors, a current trajectory of the vehicle; receiving, by the one or more processors, sensor data generated by a perception system of the vehicle having a sensor, wherein the sensor data corresponds to one or more objects in an area surrounding a vehicle; determining, by the one or more processors, based on the received sensor data, projected trajectories of the one or more objects; determining, by the one or more processors, potential collisions with the one or more objects based on the projected trajectories and the current trajectory; identifying, by the one or more processors, one of the potential collisions that is earliest in time; determining, by the one or more processors, based on the one of the potential collisions, a safety-time-horizon (STH); and when a runtime exception occurs, waiting, by the one or more processors, no longer than the STH for the runtime exception to resolve before performing a precautionary maneuver to avoid a collision.

In one example, determining the STH is based on a predetermined period of time prior to a time of the one of the potential collisions. In another example, determining the STH is based on an exception handling speed profile. In this example, the exception handling speed profile is a constant amount of deceleration for the vehicle. Alternatively, the exception handling speed profile corresponds to one or more changes to an amount of deceleration for the vehicle. In addition or alternatively, the method also includes, when the runtime exception has not resolved after the STH, performing the precautionary maneuver by using the exception handling speed profile to control the vehicle. In another example, the method also includes periodically redetermining the STH. In another example, the runtime exception corresponds to a communication delay from the sensor. In another example, the sensor is a radar unit. In another example, the runtime exception corresponds to lack of communication from the sensor of the perception system for a predetermined period of time.

Another aspect of the disclosure provides a system for exception handling for a vehicle. The system includes one or more processors configured to: receive a current trajectory of the vehicle; receive sensor data generated by a perception system of the vehicle having a sensor, wherein the sensor data corresponds to one or more objects in an area surrounding a vehicle; determine based on the received sensor data, projected trajectories of the one or more objects; determine, potential collisions with the one or more objects based on the projected trajectories and the current trajectory; identify one of the potential collisions that is earliest in time; determine based on the one of the potential collisions, a safety-time-horizon (STH); and when a runtime exception occurs, wait no longer than the STH for the runtime exception to resolve before performing a precautionary maneuver to avoid a collision.

In one example, the one or more processors are further configured to determine the STH is based on a predetermined period of time prior to a time of the one of the potential collisions. In another example, the one or more processors are further configured to determine the STH based on an exception handling speed profile. In this example, the exception handling speed profile is a constant amount of deceleration for the vehicle. In addition or alternatively, the one or more processors are further configured to determine, when the runtime exception has not resolved after the STH, perform the precautionary maneuver by using the exception handling speed profile to control the vehicle. In another example, the one or more processors are further configured to periodically redetermine the STH. In another example, the runtime exception corresponds to a communication delay from the sensor. In another example, the system also includes the sensor, and wherein the sensor is a radar unit. In another example, the runtime exception corresponds to lack of communication from a sensor of the perception system for a predetermined period of time. In another example, the system also includes the vehicle.

DETAILED DESCRIPTION

Overview

Figure 1:
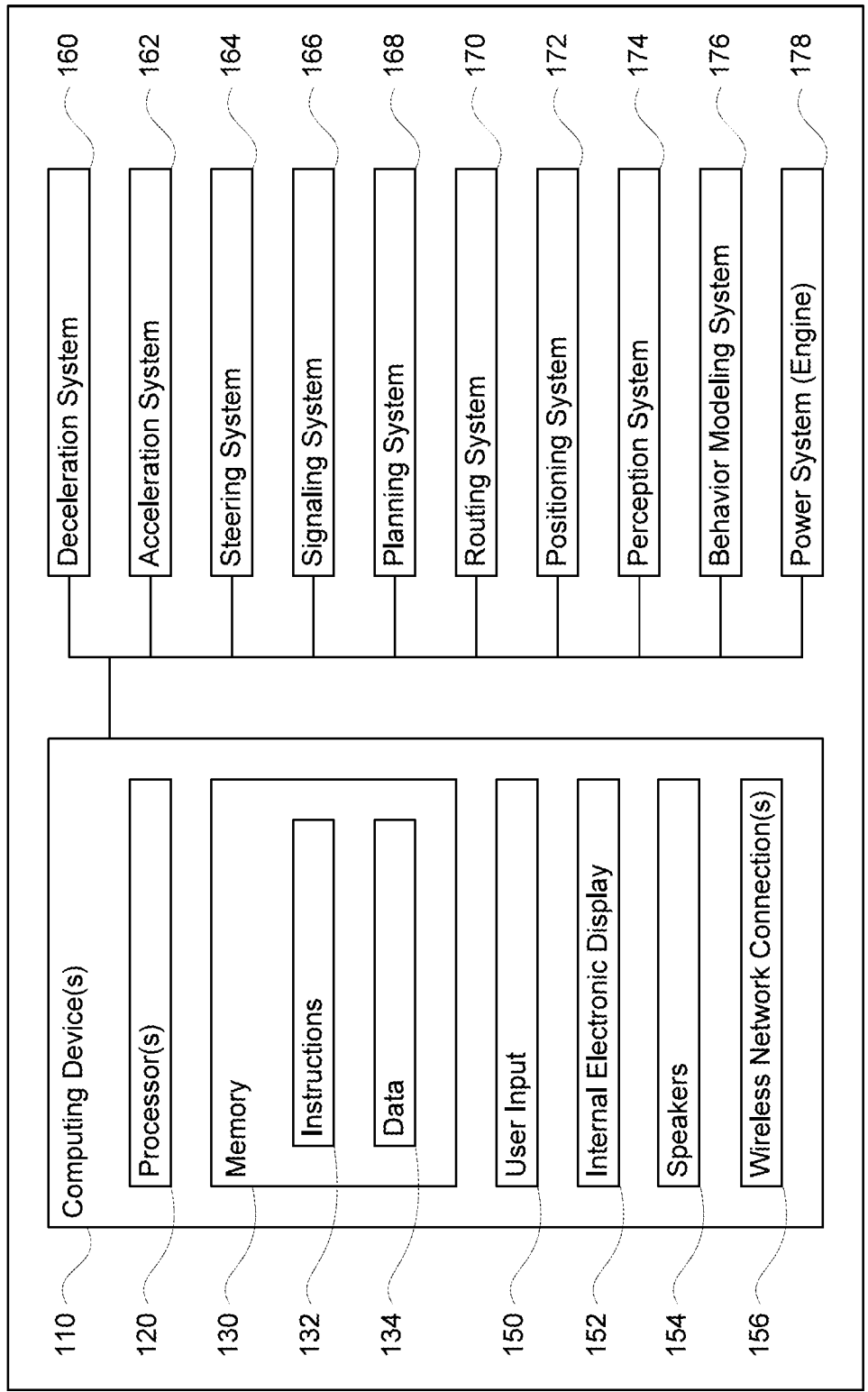
FIG. 1 is a functional diagram of an example vehicle in accordance with an exemplary embodiment.

The technology relates to handling runtime exceptions in autonomous vehicles. Autonomous vehicles may typically rely on software and hardware systems operating in a timely, cohesive manner to successfully and safely maneuver the vehicle from one point to another. In some instances, a computing device of the vehicle may encounter a runtime exception that prevents or otherwise delays the system from operating as expected. In such an instance, the vehicle may be forced to mitigate the risk introduced by the underlying cause of the runtime exception by performing a precautionary maneuver, such as quickly stopping or pulling over. Such precautionary maneuvers may result in an uncomfortable experience for passengers of the vehicle, and may not mitigate all of the risk to surrounding road users, such as drivers of other vehicles in the vicinity of the vehicle. In addition, such maneuvers may actually be unnecessary as a significant portion of runtime exceptions may eventually resolve on their own. To address these issues, the autonomous vehicle may provide a time period or safety time horizon ("STH") for the runtime exception to resolve on its own before performing a precautionary maneuver.

A computing device may control the movements of an autonomous vehicle. In this regard, the computing device may be capable of communicating with various components of the vehicle. Based on data received from the various system components, the computing device may control the direction, speed, acceleration, etc. of the vehicle by sending instructions to the various components of the vehicle.

Runtime exceptions may be generated in instances where the computing device, or one of the systems, of the autonomous vehicle encounters a situation that it was not programed to handle or does not receive enough information to handle. Such runtime exceptions may be caused by processing delays, communication delays or lack of communications for some period of time, software or hardware failures, or other such situations which result in the computing device not being able to operate as expected.

For instance, the perception system of the vehicle may include a RADAR system which sends and receives signals at a 10 Hz rate. As such, the perception system may expect, and in some cases, rely on receiving RADAR signals every 100 ms. However, the perception system may not receive a RADAR signal for a period of 150 ms due to a communication delay. This 50 ms delay may trigger a runtime exception. In another example, the perception system vehicle may not receive RADAR signal at the expected 100 ms rate due to the RADAR losing power as the result of a faulty power cord, which may also trigger a runtime exception as a message would not have been received within a reasonable time limit (as determined, for instance, by using a timer). This may be handled by the same or a separate software module.

Some runtime exceptions may resolve on their own after a period of time, while others may require outside intervention. For instance, the runtime exception caused by communication delay of the RADAR may be the result of an object blocking RADAR signals from being received by the RADAR or from processing delays in a computing device of the radar and/or the perception system, such as when the computing device is overloaded with processing tasks. In the first instance, the runtime exception may be resolved once the object has moved, thereby allowing the RADAR to receive RADAR signals again. In the second instance, the load on the computing device may become normal, thereby allowing the RADAR to continue to provide sensor data to the perception system and/or other systems of the vehicle. Although the aforementioned examples relate to RADAR, similar runtime exceptions and resolutions may occur at other sensors and computing devices of the vehicle. Other runtime exceptions, such as the runtime exception caused by a faulty power cord, may require outside intervention to be resolved, such as by a technician replacing the faulty power cord.

However, the vehicle's computing devices may not know the underlying cause which triggered the runtime exception and, as such, the vehicle's computing devices may not know whether a runtime exception may possibly resolve on its own or require outside intervention. Even in instances where the computing device is aware of the cause of the runtime exception, the computing device may not know the amount of time before the runtime exception may resolve.

The vehicle's computing devices may leverage the possibility that a runtime exception may resolve on its own by providing a period of time (or rather an expected point in time) for the runtime exception to recover before performing a precautionary maneuver. The expected point in time that the runtime exception is provided to recover by or the STH may allow the vehicle to avoid the need to perform a precautionary maneuver in the event the runtime exception is recovered. Accordingly, the autonomous vehicle may maintain its current trajectory while waiting for the runtime exception to resolve during the STH. As a result, the autonomous vehicle may avoid unnecessary maneuvers if the runtime exception resolves and thereby also maintain the comfort level of its passengers.

The vehicle's computing devices may determine STH based on a current trajectory of the autonomous vehicle, as well as projected trajectories of objects external to the autonomous vehicle. The current trajectory of the vehicle may be generated by a planning system of the vehicle. Each trajectory may include a geometry component describing a future physical path of the vehicle and a speed profile describing the vehicle's future speed and changes in speed over time. The current trajectory may then be sent to and processed by various other systems of the vehicle in order to make driving and other decisions in order to enable the vehicle's computing devices to control the vehicle.

A behavior modeling system of the vehicle may continually, or at predetermined time periods generate for each observed object external to the autonomous vehicle, one or more projected trajectories. The behavior modeling system may input the sensor data received from the perception system into one or more models and determine or generate one or more projected trajectories for the objects. Each projected trajectory may correspond to a possible path that the object may potentially traverse as well as the times that the object is expected to be at different points along that path. These projected trajectories may then be sent to and processed by various other system of the vehicles in order to make driving and other decisions for the vehicle.

The projected trajectories of the objects may be compared to the current trajectory of the autonomous vehicle in order to identify potential collisions. From this comparison, the vehicle's computing devices may determine potential locations and times where the current trajectory of the autonomous vehicle will intersect with the trajectories of the objects. Such locations and times may correspond to locations and times of potential collisions or where collisions are predicted to occur at some point in the future.

The vehicle's computing devices may then identify the earliest possible collision in time. The vehicle's computing devices determine the STH for the earliest possible collision in time. If the runtime exception resolves itself during the STH, the vehicle's computing devices may continue to control the vehicle without taking a precautionary maneuver or performing some other exception handling function. If the runtime exception does not resolve itself, the vehicle's computing devices will still have time to take a precautionary maneuver or perform some other exception handling function.

The features described herein may allow an autonomous vehicle to avoid taking unnecessary or overly cautious precautionary measures in the event of a runtime exception which self resolves. By doing such, the autonomous vehicle may continue operating as expected, thereby avoiding delays or unexpected and uncomfortable maneuvers which may lead to passenger discomfort while still maintaining the safety of the vehicle and its passengers.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
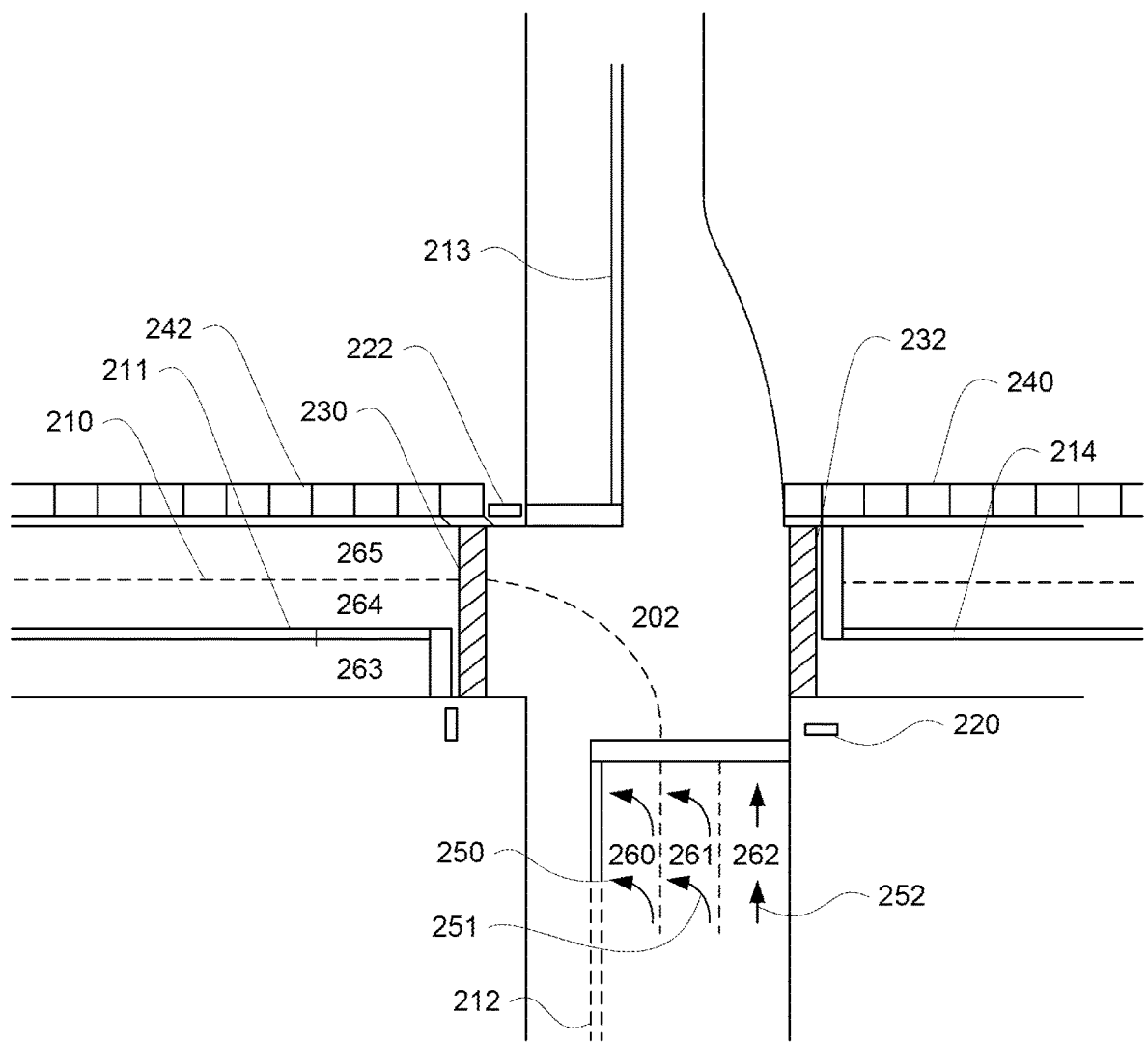
FIG. 2 is an example of map information in accordance with aspects of the disclosure.

FIG. 2 is an example of map information 200 for a section of roadway including an intersection 202. The map information 200 includes information identifying the shape, location, and other characteristics of various features including lane lines 210, 211, 212, 213, 214, traffic control devices 220, 222 (which may include, for example, traffic signal lights, stop signs, etc.), crosswalks 230, 232, sidewalks 240, 242, road markings including arrows 250, 251, 252, as well as features such as lanes 260, 261, 262, 263, 264, 265. Although only a few features are shown and identified, the map information 200 may be highly-detailed and include various additional features.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
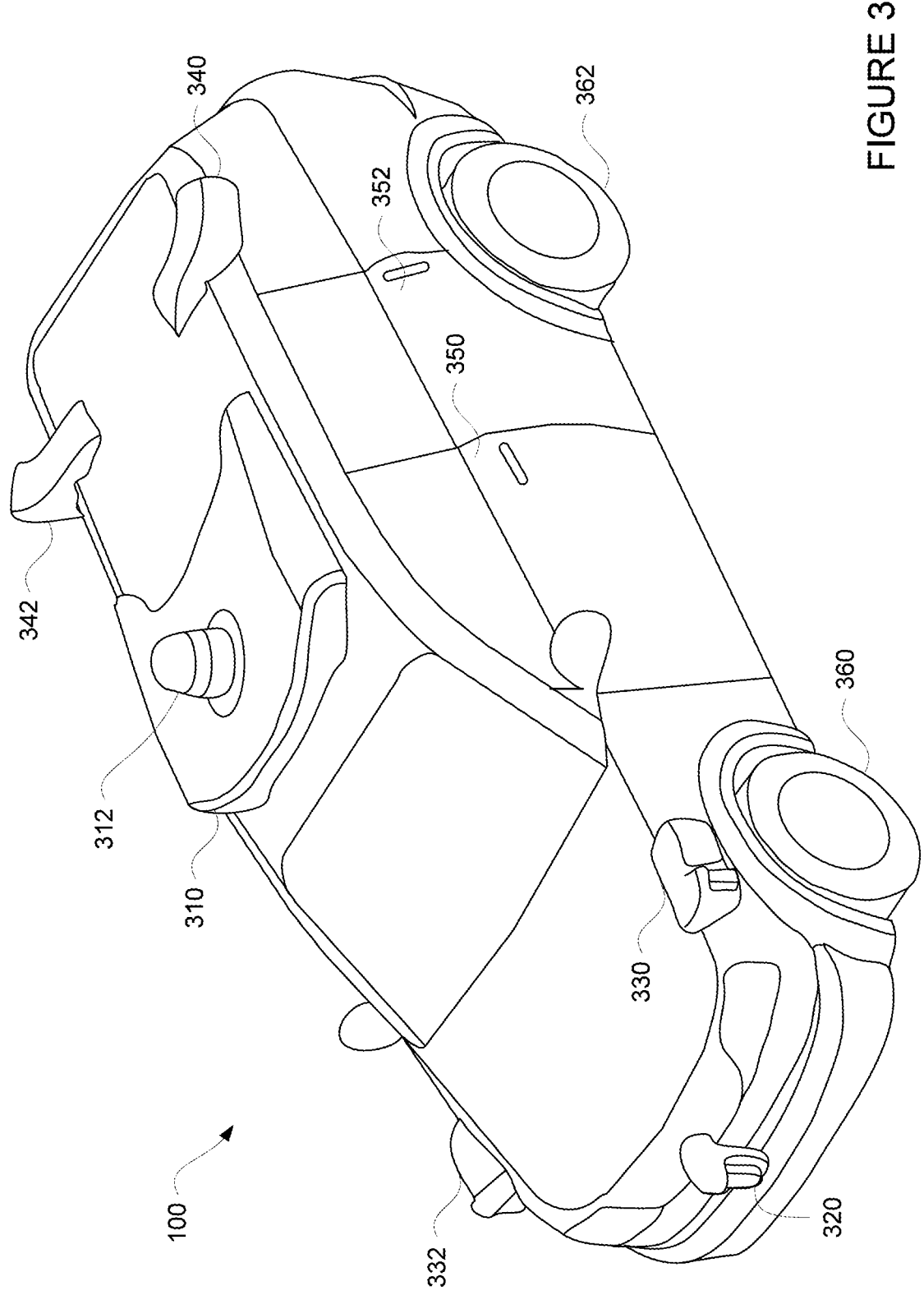
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

The vehicle's computing devices may leverage the possibility that a runtime exception may resolve on its own by providing a period of time (or rather an expected point in time) for the runtime exception to recover before performing a precautionary maneuver. The expected point in time for the runtime exception is provided to recover by or the STH may allow the vehicle to avoid the need to perform a precautionary maneuver in the event the runtime exception is recovered. Accordingly, the autonomous vehicle may maintain its current trajectory while waiting for the runtime exception to resolve during the STH. As a result, the autonomous vehicle may avoid unnecessary maneuvers if the runtime exception resolves and thereby also maintain the comfort level of its passengers.

Figure 4:
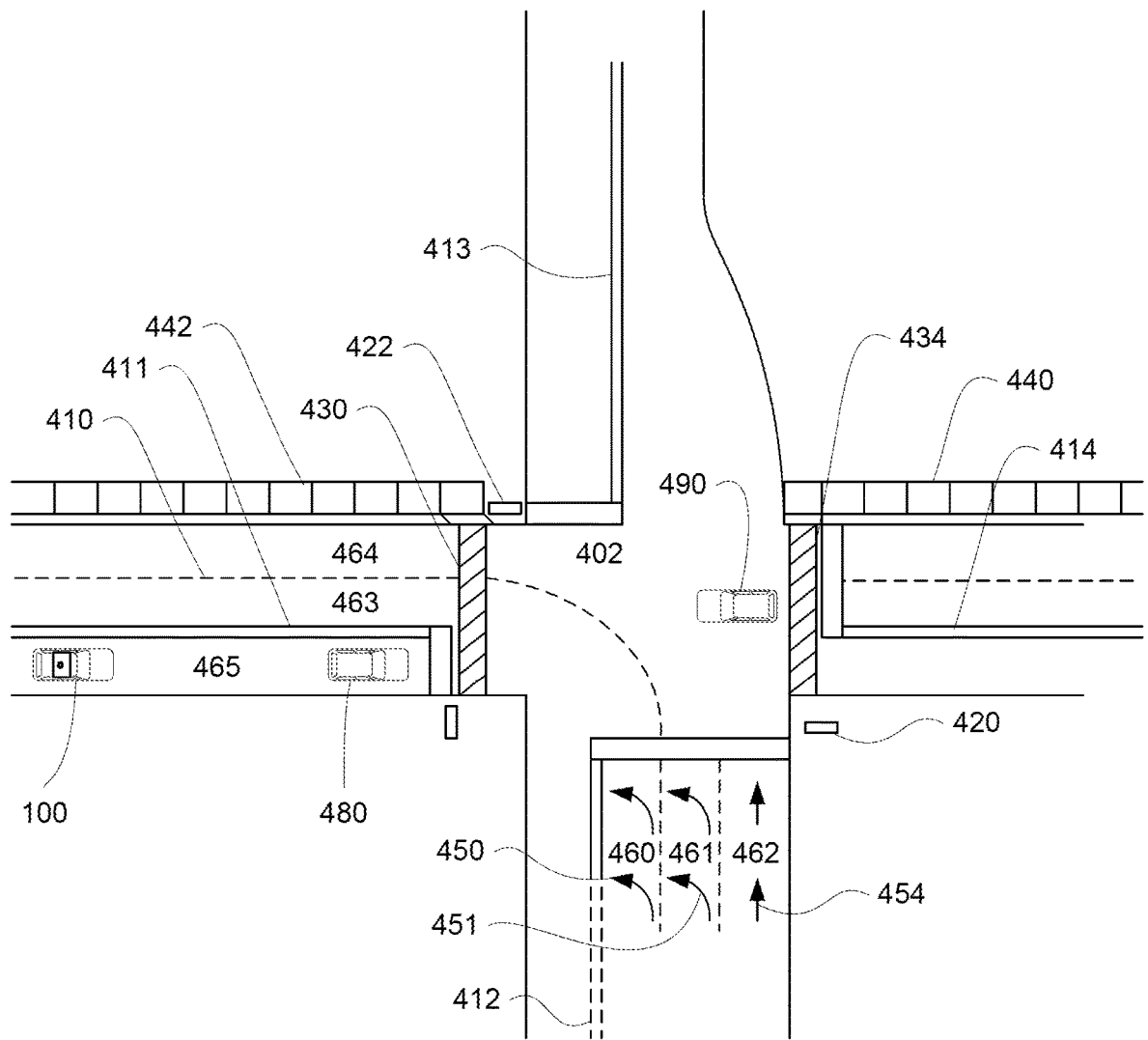
FIG. 4 is an example of a vehicle driving on a section of roadway in accordance with aspects of the disclosure.

FIG. 4 represents vehicle 100 driving in a section of roadway 400 corresponding to the map information 200. Roadway 400 includes information identifying the shape, location, and other characteristics of various features including intersection 402 corresponding to intersection 202, lane lines 410, 411, 412, 413, 414 corresponding to lane lines 210, 211, 212, 213, 214, traffic control devices 420, 422 corresponding to traffic control devices 220, 222, crosswalks 430, 434 corresponding to crosswalks 230, 232, sidewalks 440, 442 corresponding to sidewalks 240, 242, arrows 450, 451, 454 corresponding to arrows 250, 251, 252, as well as lanes 460, 461, 462, 465, 463, 464 corresponding to lanes 260, 261, 262, 263, 264, 265. In this example, vehicle 100 is approaching intersection 402 in lane 465. In addition, vehicle 480 is also approaching intersection 402 in lane 465, and a vehicle 490 is in intersection 402 approaching vehicle 100 (though in-line with lane 463). This example depicts the vehicle 100 at location $l_1$ and at time $t_1$.

Figure 9:
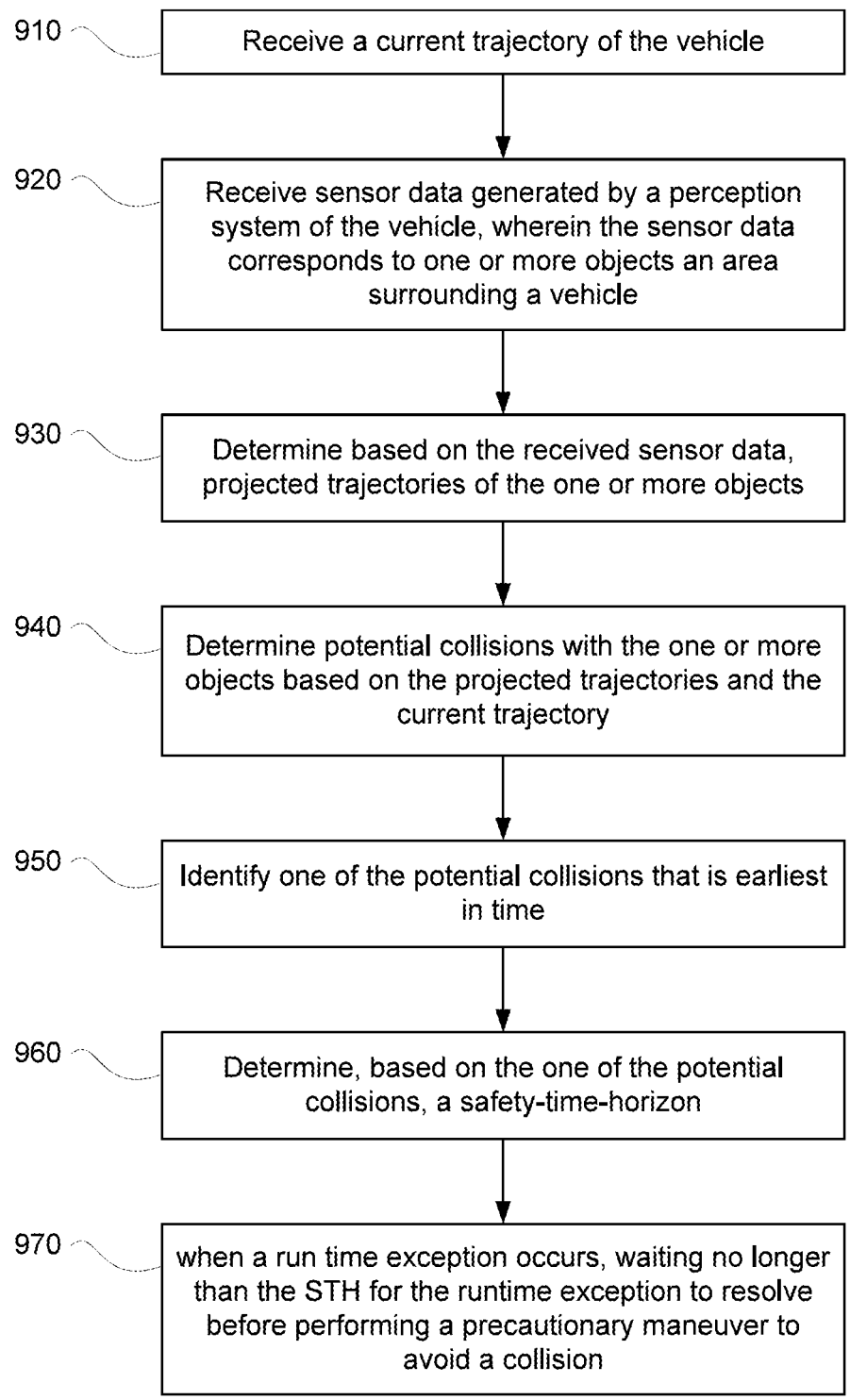
FIG. 9 is an example flow diagram in accordance with aspects of the disclosure.

FIG. 9 is an example flow diagram 900 of aspects of the technology described herein for exception handling for a vehicle, such as vehicle 100, which may be performed by one or more processors of one or more computing devices of the vehicle, such as processors 120 of computing devices 110. At block 910, a current trajectory of the vehicle is received. The current trajectory of the vehicle may be generated by the planning system 168 based on a route generated by the routing system 170, predicted trajectories generated by the behavior modeling system 176, as well as sensor data and other data generated by the perception system 174. Each trajectory may include a geometry component describing a future physical path of the vehicle and a speed profile describing the vehicles future speed and changes in speed over time. The current trajectory may then be sent to and processed by various other system of the vehicles in order to make driving and other decisions for the vehicle, including, for instance, the vehicle's computing devices such as computing devices 110. Turning to the example of FIG. 5, vehicle 100 is currently following a trajectory 500.

Returning to FIG. 9, at block 920, sensor data generated by a perception system of the vehicle is received. This sensor data corresponds to one or more objects in an area surrounding the vehicle. For instance, the perception system 174 may use the various sensors of the vehicle to generate sensor data. The sensor data may be raw or processed sensor data as well as other information about the characteristics of objects in the area surrounding the vehicle 100. This may include, for instance, location, heading, orientation, velocity, acceleration/deceleration, changes in acceleration/deceleration, etc.

The behavior modeling system 176 of the vehicle may continually, or at predetermined time periods, such as every 100 ms, or more or less, generate for each observed object external to the autonomous vehicle, one or more projected trajectories. For instance, the behavior modeling system 176 may receive sensor data and other data from the perception system 174 for an object. Again, sensor data may be raw or processed sensor data as well as other information about the characteristics of objects in the area surrounding the vehicle 100.

At block 930, projected trajectories of the one or more objects may be determined based on the received sensor data. For instance, the behavior modeling system 176 may input the sensor data received from the perception system 174 into one or more models and determine or generate one or more projected trajectories for the objects. These projected trajectories may then be sent to and processed by various other system of the vehicles in order to make driving and other decisions for the vehicle, including, for instance, the vehicle's computing devices such as computing devices 110.

The models may be based on typical operating procedures of similar objects. For instance, the projected trajectories for a vehicle stopped at a light may be based on typical operations (e.g., speed, acceleration, heading, etc.,) of other vehicles at the same light or similar lights. In some instances, the models may also be based on irregular operations of a similar object. For example, the projected trajectories for a vehicle stopped at a light may include trajectories corresponding to the stopped vehicle backing up, rapidly accelerating, rapidly stopping after starting to move, etc. Projected trajectories based on irregular operations may be limited to physically feasible possibilities. In other words, the irregular operations used to generate a projected trajectory may be an action the object is known to be able to perform.

Each projected trajectory may correspond to a possible path that the object may potentially traverse as well as the times that the object is expected to be at different points along that path. For instance, the behavior modeling system may generate projected trajectories for a vehicle stopped at an intersection and a vehicle traveling through the intersection using the aforementioned data provided by the perception system. Returning to FIG. 5, for vehicle 480, which may be stopped at intersection 402, the behavior modeling system may generate projected trajectories 580, 582, 584. For vehicle 490, which may be traveling through intersection 402, the behavior modeling system may generate projected trajectories 590, 592. Although only five projected trajectories are shown, there may be more or less projected trajectories generated for each object. In some instances, stationary objects, such as road signs, trees, etc., may be filtered by, or otherwise ignored or not processed by the behavior modeling system.

Returning to FIG. 9, at block 940, potential collisions with the one or more objects may be determined based on the projected trajectory and the current trajectory (of the vehicle). For instance, the projected trajectories of the objects may be compared to the current trajectory of the autonomous vehicle in order to identify potential collisions. From this comparison, the vehicle's computing devices, such as computing devices 110, may determine potential locations and times where the current trajectory of the autonomous vehicle, for example trajectory 500, will intersect with the trajectories of the objects. Such locations and times may correspond to locations and times of potential collisions or where collisions are predicted to occur at some point in the future.

Figure 6:
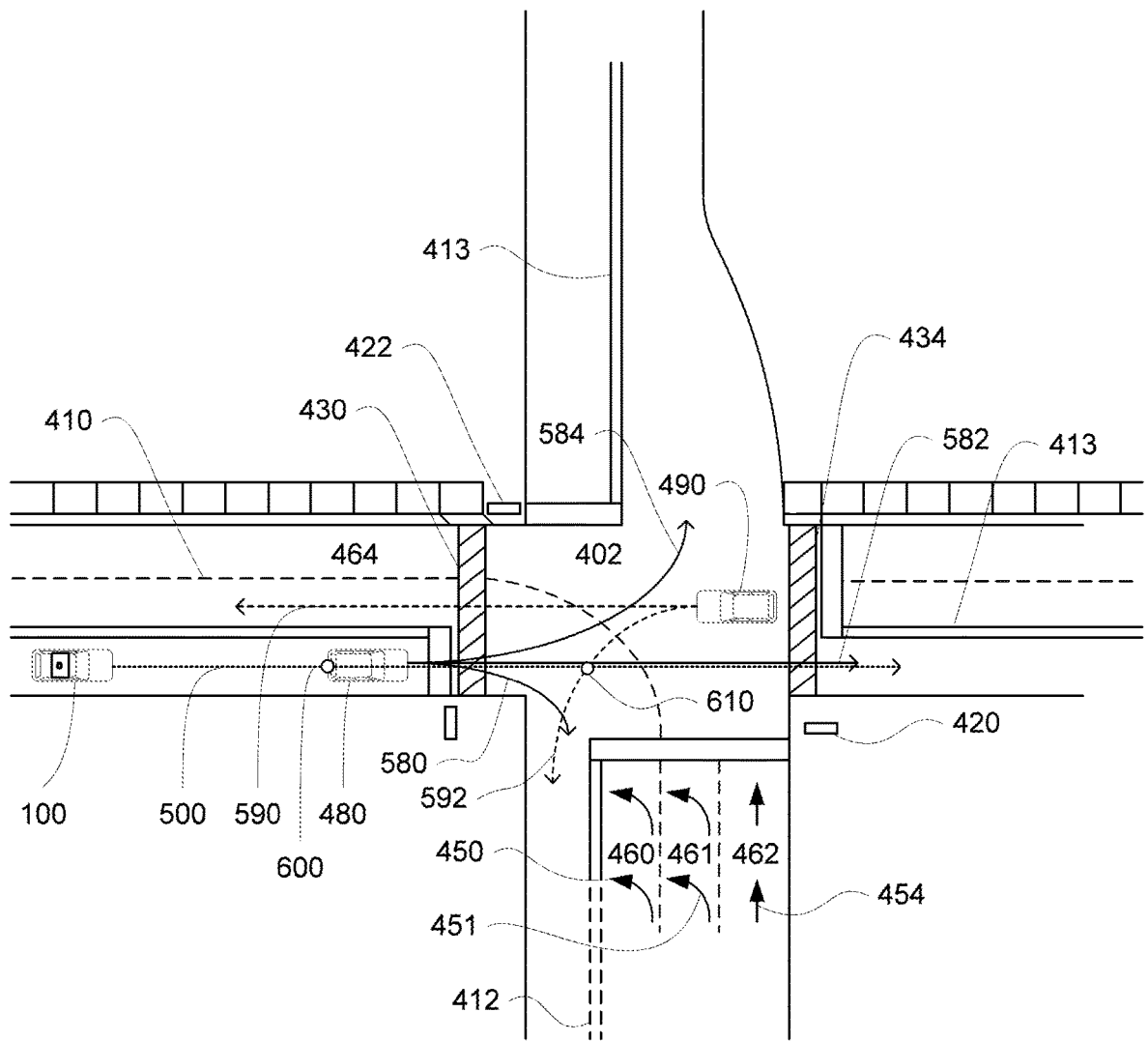
FIG. 6 continues the example of FIG. 5 with additional data in accordance with aspects of the disclosure.

For example, turning to FIG. 6, the current trajectory of the autonomous vehicle may result in collisions with projected trajectories of the stopped vehicle and the vehicle traveling through the intersection as represented by the location dots 600, 610, respectively. In other words, these location dots may represent combinations of locations and times at which the trajectory 500 will intersect with the projected trajectories of vehicles 480 and 490. For example, location dot 600 may represent a possible collision at time $t_2$ and location $l_2$, and similarly, location dot 610 may represent a possible collision at time $t_3$ and location $l_3$. Thus, although location dot 610 is close to projected trajectory 582, this location dot does not represent a potential collision with vehicle 480 as vehicle 480 and vehicle 100 will not intersect in time (only in location).

Figure 5:
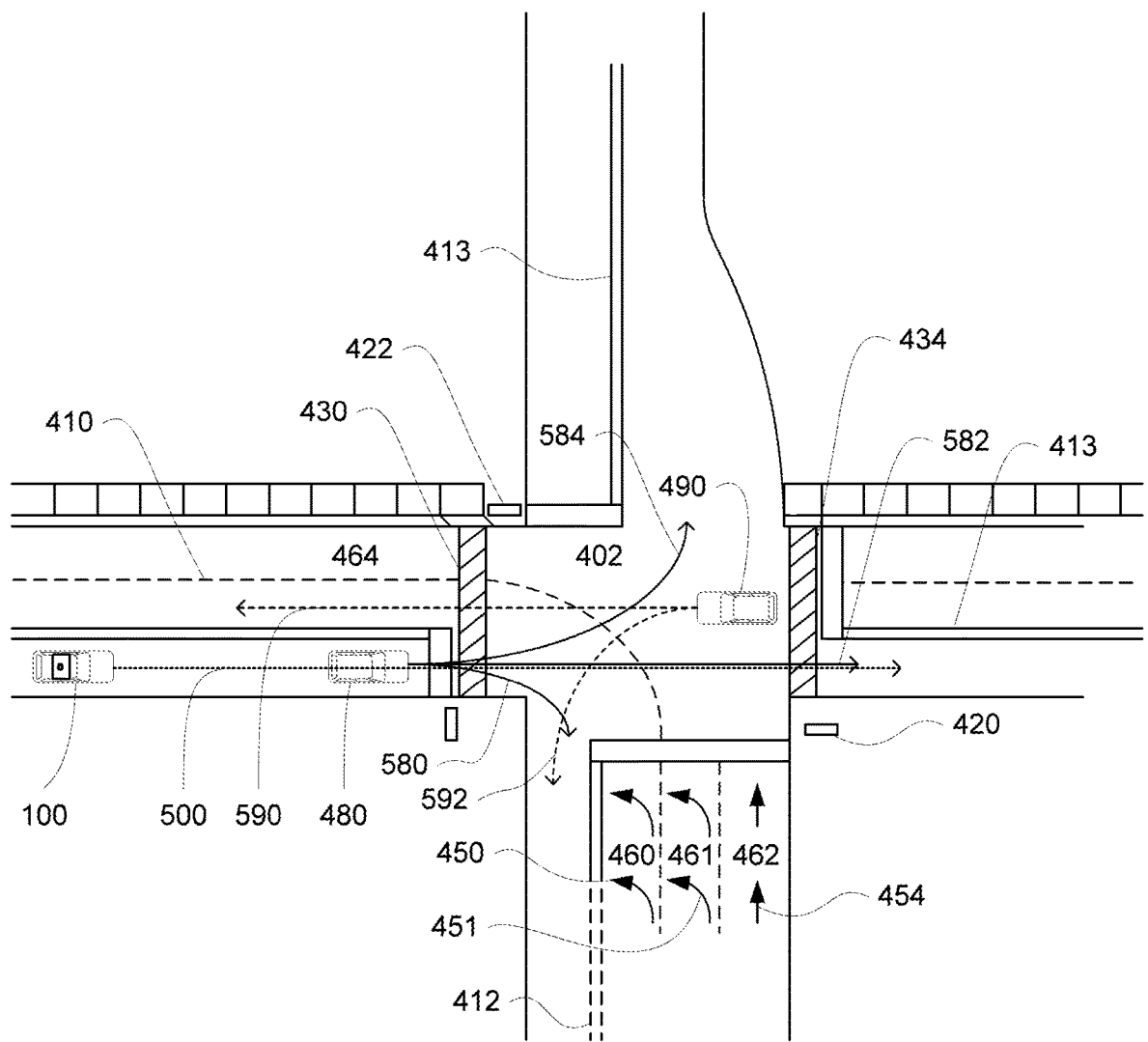
FIG. 5 continues the example of FIG. 4 with additional data in accordance with aspects of the disclosure.

Returning to FIG. 9, at block 950, one of the potential collisions that is earliest in time may be identified. For instance, the vehicle's computing devices, such as computing devices 110, may identify the earliest possible collision in time. For example, as noted above, the current location of the vehicle is $l_1$ at time $t_1$ as represented by the examples of FIGS. 4, 5 and 6. In this example, a first potential collision in time may be likely to occur with vehicle 480 at location $l_2$ and time $t_2$ (i.e. location dot 600) and a second potential collision in time may be likely to occur with vehicle 490 at location $l_3$ and time $l_3$ (i.e. location dot 610).

Returning to FIG. 9, at block 960, a safety-time-horizon is determined based on the potential collisions. The vehicle's computing devices may determine the STH for the earliest possible collision in time. As in the example, above, the earliest possible collision in time may occur at a time $t_2$ and location $l_2$. In this regard, the STH may be a specific point in time t' or some period of time from the current time $t_1$ to a time t'. The time t' may be a point in time which is some predetermined period prior to the time of the earliest possible collision (here, $t_2$) in order to allow the autonomous vehicle to wait at least the predetermined period of time to handle the runtime exception. The vehicle's computing devices may then solve for the time t' using the following equations:

$$\int_{t_1}^{t'} f(t)dt + \int_{t'}^{t_2} f_e(t)dt = l_2 - l_1$$

$$f(t') = f_e(t')$$

$$t_1 \le t' \le t_2$$

In this example, f(t) is the autonomous vehicle's current trajectory speed profile and $f_e(t)$ is an exception handling speed profile for the autonomous vehicle.

As one example, the exception handling speed profile may include applying constant amount of deceleration until the vehicle comes to a complete stop. As an example, this constant amount of deceleration may be −6 m/s$^2$ or more or less. However, as this rate of deceleration is to be used in the case of an emergency, it may be fairly uncomfortable for passengers. Of course, more complex speed profiles, during which the acceleration changes over time may also be used. For instance, the speed profile may be based on the type of data causing the runtime exception (e.g. the data that is being delayed). For example, if the cause of the runtime exception is higher priority, the sensor data from the perception system is missing or not received timely, the speed profile may cause the vehicle to automatically "slam" on the brakes. As another example, if the cause of the runtime exception is lesser priority, such as a connection to a remote computing device, the speed profile may cause the vehicle to slow down at a more reasonable speed.

Returning to FIG. 9, at block 970, when a runtime exception occurs, waiting no longer than the safety-time-horizon for the runtime exception to resolve before performing a precautionary maneuver to avoid a collision. In the event of a runtime exception, the vehicle's computing devices may wait the period of the STH, or rather, the time period from $t_1$ to t' for the runtime exception to resolve. If the STH passes and the runtime exception has not resolved, the vehicle's computing devices may engage an exception handling response. This exception handling response may include the exception handling speed profile.

Figure 7:
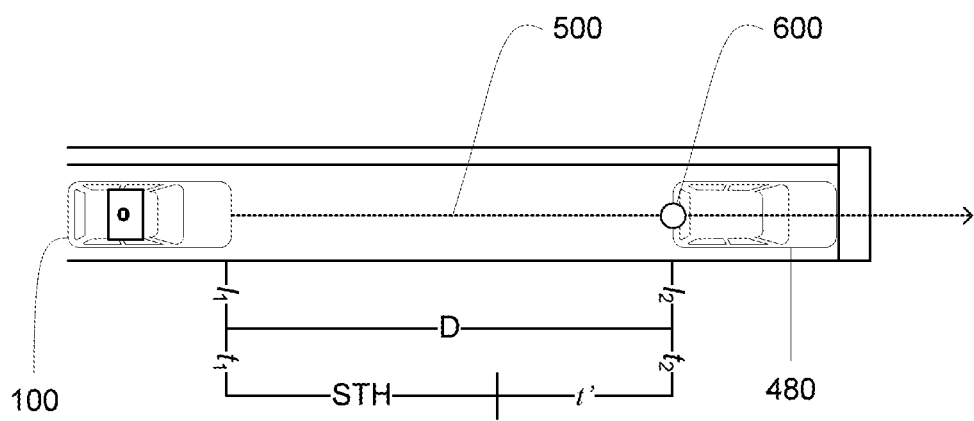
FIG. 7 is an example illustration of aspects of the example of FIG. 6 and additional data in accordance with aspects of the disclosure.

FIG. 7 illustrates an example operating situation of vehicle 100 corresponding to the examples of FIGS. 4, 5, and 6. In the example, at time $t_1$, vehicle 100 is at location $l_1$ traveling at a constant (i.e. not accelerating or decelerating) velocity of 10 m/s (i.e., fit)). Vehicle 480 is positioned a distance D (for instance, 100 meters) ahead at location $l_2$ and is stopped. As noted above, the vehicle's computing devices may determine the earliest possible collision in time is at the location dot 600, or at vehicle 480's current location $l_2$. The estimated time of the earliest possible collision, $t_2$, in this example, may be 5 seconds from the current time $t_1$. In addition, vehicle 100 may be capable of decelerating (or for instance, reliably decelerating) at a rate of −5 m/s$^2$. In view of this information the computing devices, such as computing devices 110, may determine the vehicle 100 must decelerate from 20 m/s to 0 to avoid colliding with vehicle 480. This level of deceleration may be the exception handling speed profile.

Using the above data, the vehicle's computing devices, such as computing devices 110, may determine that the autonomous vehicle will take at least 4 seconds (20 m/s/−5 m/s$^2$) to make a full stop before vehicle 480 (assuming vehicle 480 remains stationary). As such, the vehicle 100 must begin decelerating 40 m behind vehicle 480, or, stated another way, 60 m ahead of current position $l_1$ to avoid a collision. In this regard, the vehicle may be able to continue at its current speed for the next 3 seconds (60 m/20 m/s)

while safely ignoring any runtime exception. Thus, the STH may be 3 seconds. In other words, for a runtime exception occurring at time $t_1$, the vehicle's computing devices may wait 3 seconds for the runtime exception to resolve.

If the runtime exception resolves itself during the STH, such as is described above, the vehicle's computing devices may continue to control the vehicle without taking a precautionary maneuver or performing some other exception handling function. If the runtime exception does not resolve itself, the vehicle's computing devices will still have time to take a precautionary maneuver or perform some other exception handling function. For example, returning to FIG. 7, the vehicle's computing devices, such as computing devices 110, may have the time $t_s$ (here, $t_s=2$ s) to decelerate according to the exception handling speed profile and stop before vehicle 480.

Figure 8:
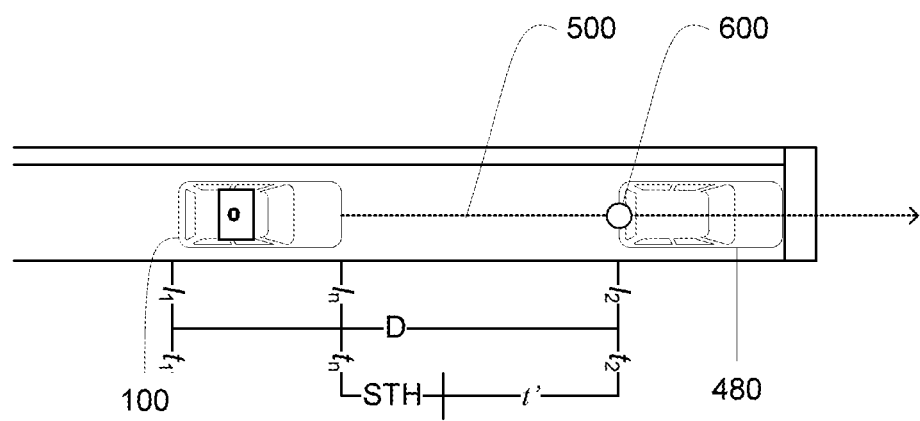
FIG. 8 continues the example of FIG. 7 with additional data in accordance with aspects of the disclosure.

Turning to the example of FIG. 8, representing a time $t_n$, corresponding to 2 s after the time $t_1$, vehicle 100 has moved closer to vehicle 480 than in the example of FIG. 7. If a runtime exception were to occur at this time, the STH would be only 1 s. For example, STH=3 s−2 s=1 s. As such, the vehicle's computing devices may wait only 1 second before beginning to decelerate according to the exception handling speed profile and stop before vehicle 480. In other words, once the vehicle 100 reaches location $l_n$, the vehicle 100 must begin to decelerate according to the exception handling speed profile.

The STH may be determined (or redetermined) periodically, for example, every 100 ms or more or less or each time new sensor data is received from the perception system. In this regard, the vehicle's computing devices, such as computing devices 110, may continuously be counting down this period until a new period is determined. Alternatively, the STH may be determined in response to a runtime exception, and the counting down may be initiated once the STH is determined. In this regard, once a runtime exception occurs, the vehicle's computing devices may wait at least the STH for the runtime exception to resolve on its own. Again, if the runtime exception does not resolve on its own during the STH, the vehicle's computing devices may automatically initiate a precautionary maneuver, such as quickly stopping or pulling over.

The features described herein may allow an autonomous vehicle to avoid taking unnecessary or overly cautious precautionary measures in the event of a runtime exception which self resolves. By doing such, the autonomous vehicle may continue operating as expected, thereby avoiding delays or unexpected and uncomfortable maneuvers which may lead to passenger discomfort while still maintaining the safety of the vehicle and its passengers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of exception handling for a vehicle, the method comprising:
recieving, by the one or more processors, sensor data generated by a perception system of the vehicle having a sensor, wherein the sensor data corresponds to an object in an area surrouding a vehicle;
estimating, by the one or more processors, a protential collision with the object based on a current trajectory being followed by the vehicle;
determining, by the one or more processors, based on the potential collision, a safety-time-horizon (STH);
when a runtime exception occurs, continuing, by the one or more processors, to follow the current trajectory until the STH is reached; and
when the STH is reached and the runtime exception has not resolved, performing, by the one or more processors, a precautionary maneuver to avoid a collision with the object.

2. The method of claim 1, wherein determining the STH enables the vehicle to perform the precautionary maneuver before an expected time of the potential collision.

3. The method of claim 1, wherein determining the STH is based on an exception handling speed profile.

4. The method of claim 3, wherein the exception handling speed profile is a constant amount of deceleration for the vehicle.

5. The method of claim 3, wherein the exception handling speed profile corresponds to one or more changes to an amount of deceleration for the vehicle.

6. The method of claim 1, further comprising, periodically redetermining the STH prior to performing the precautionary maneuver as new sensor data is received.

7. The method of claim 1, wherein the runtime exception corresponds to a communication delay from the sensor.

8. The method of claim 1, wherein the runtime exception corresponds to lack of communication from the sensor of the perception system for a predetermined period of time.

9. The method of claim 1, wherein the precautionary maneuver includes one of pulling over or stopping the vehicle.

10. A system for exception handling for a vehicle, the system comprising one or more processors configured to:
receive sensor data generated by a perception system of the vehicle having a sensor, wherein the sensor data corresponds to an object in an area surrounding a vehicle;
estimate a potential collision with the object based on a current trajectory being followed by the vehicle;
determine based on the potential collision, a safety-time-horizon (STH);
when a runtime exception occurs, continue to follow the current trajectory until the STH is reached; and
when the STH is reached and the runtime exception has not resolved, perform a precautionary maneuver to avoid a collision with the object.

11. The system of claim 10, wherein the one or more processors are further configured to determine the STH in order to enable the vehicle to perform the precautionary maneuver before an expected time of the potential collision.

12. The system of claim 10, wherein the one or more processors are further configured to determine STH based on an exception handling speed profile.

13. The system of claim 12, wherein the exception handling speed profile is a constant amount of deceleration for the vehicle.

14. The system of claim 12, wherein the exception handling speed profile corresponds to one or more changes to an amount of deceleration for the vehicle.

15. The system of claim 10, wherein the one or more processors are further configured to periodically determine the STH prior to performing the precautionary maneuver as new sensor data is received.

16. The system of claim 10, wherein the runtime exception corresponds to a communication delay from the sensor.

17. The system of claim 10, wherein the runtime exception corresponds to lack of communication from the sensor of the perception system for a predetermined period of time.

18. The system of claim 10, wherein the precautionary maneuver includes one of pulling over or stopping the vehicle.

19. The system of claim 10, further comprising the vehicle.

* * * * *

UNITED STATES PATENT AND TRADEMARK OFFICE
CERTIFICATE OF CORRECTION

| | |
|---|---|
| PATENT NO. | : 11,709,503 B2 |
| APPLICATION NO. | : 17/712760 |
| DATED | : July 25, 2023 |
| INVENTOR(S) | : Dong Li et al. |

It is certified that error appears in the above-identified patent and that said Letters Patent is hereby corrected as shown below:

In the Claims

Claim 1, Column 14, Line 4:
Now reads: "recieving, by the one or more processors,"; should read -- receiving, by one or more processors, --

Claim 1, Column 14, Line 7:
Now reads: "in an area surrouding a vehicle"; should read -- in an area surrounding a vehicle --

Claim 1, Column 14, Lines 8 and 9:
Now reads: "estimating, by the one or more processors, a protential collision"; should read -- estimating, by the one or more processors, a potential collision --

Signed and Sealed this
Tenth Day of October, 2023

*Katherine Kelly Vidal*

Katherine Kelly Vidal
*Director of the United States Patent and Trademark Office*